United States Patent [19]

Hatada et al.

[11] 4,295,122

[45] Oct. 13, 1981

[54] BUS PRIORITY CONTROL METHOD IN LOOP BUS NETWORK SYSTEM

[75] Inventors: Minoru Hatada; Kunio Hiyama, both of Sagamihara; Hirokazu Ihara, Machida; Hisao Kuma, Tokyo, all of Japan

[73] Assignee: Hitachi, Ltd., Tokyo, Japan

[21] Appl. No.: 86,443

[22] Filed: Oct. 19, 1979

[30] Foreign Application Priority Data

Oct. 30, 1978 [JP] Japan ................................ 53-132656

[51] Int. Cl.³ ............................................. H04Q 9/00
[52] U.S. Cl. ......................... 340/147 LP; 340/147 SY
[58] Field of Search .......................... 364/200 MS File; 340/147 SY, 147 LP

[56] References Cited

U.S. PATENT DOCUMENTS

| | | | |
|---|---|---|---|
| 3,363,234 | 1/1968 | Erickson | 364/200 MS |
| 3,643,218 | 2/1972 | Cramwinckel | 445/1 |
| 3,706,974 | 12/1972 | Patrick | 445/1 |

Primary Examiner—Harold I. Pitts
Attorney, Agent, or Firm—Craig and Antonelli

[57] ABSTRACT

In a loop bus network system where a plurality of processors are connected to a unidirectional loop bus and each of the processors generates a transmission message with a level number which designates the bus use priority of the message, each of node processors, in which message transmission request is generated, transmits to the loop bus a bus control data including a level number of the message generated therewithin and a data which represents the bus use priority assigned to each node processor for that level number. Each of the node processors compares the bus control data transmitted therefrom to a succeeding node with a control data received from a preceding node and then transmits only the larger data of the compared two data, thereby to ascertain that only one bus control data propagates around the loop and a loop bus use priority is assigned to one of the node processors that has generated the above-mentioned one bus control data.

17 Claims, 8 Drawing Figures

FIG. 2B
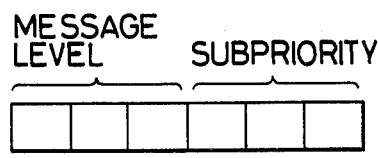
FIG. 2C
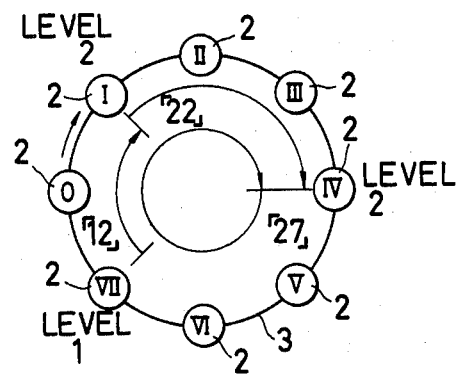
FIG. 2D
|  | | NODE PROCESSOR NUMBER | | | | | | | |
|---|---|---|---|---|---|---|---|---|---|
|  | | 0 | I | II | III | IV | V | VI | VII |
| MESSAGE LEVEL | 0 | 7 | 6 | 5 | 4 | 3 | 2 | 1 | 0 |
|  | 1 | 1 | 0 | 7 | 6 | 5 | 4 | 3 | 2 |
|  | 2 | 4 | 3 | 2 | 1 | 0 | 7 | 6 | 5 |
|  | 3 | 5 | 4 | 3 | 2 | 1 | 0 | 7 | 6 |

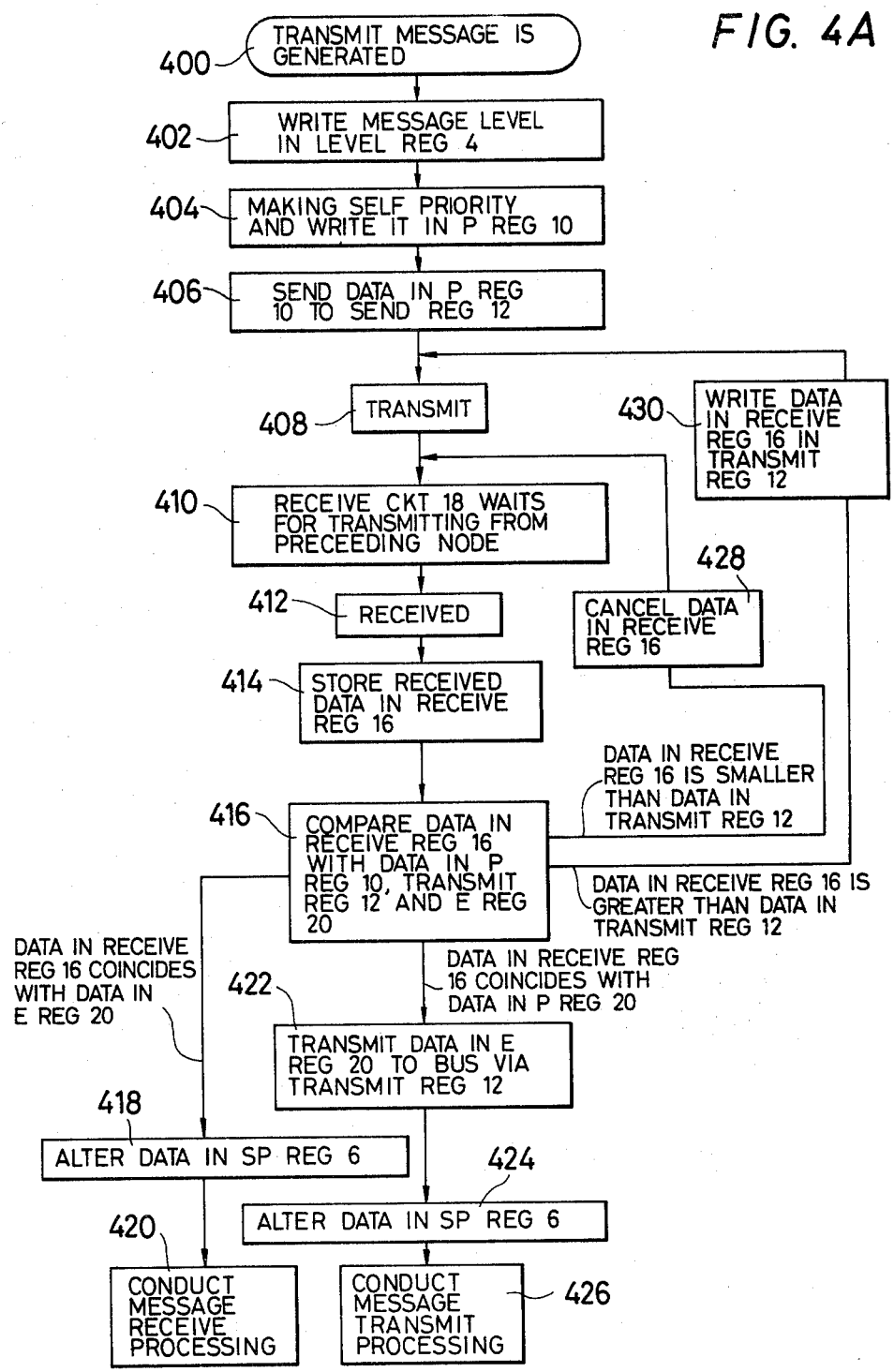

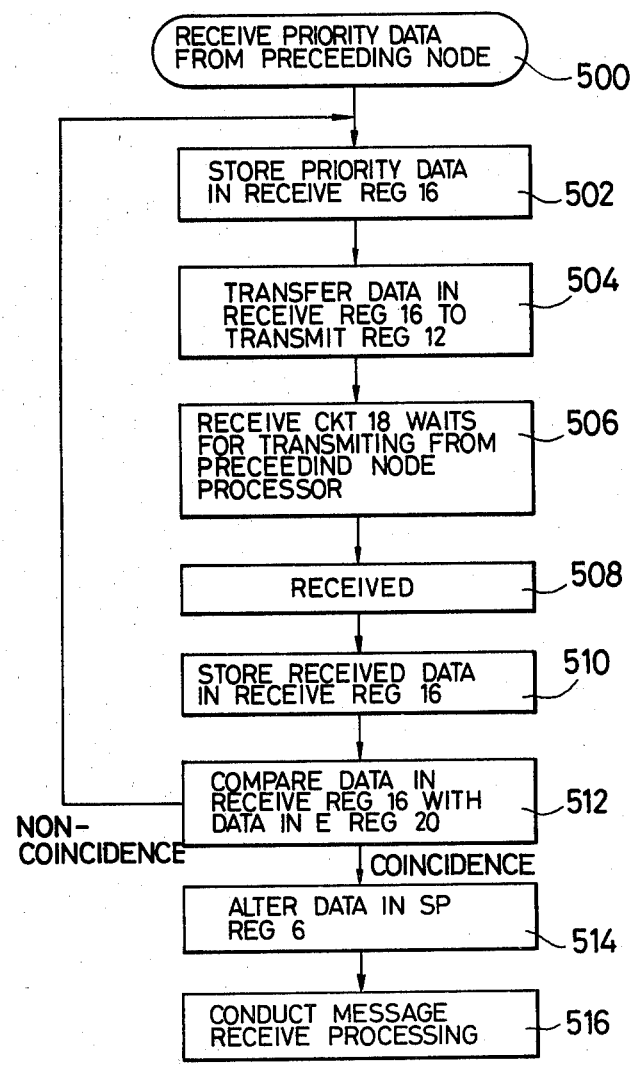

BUS PRIORITY CONTROL METHOD IN LOOP BUS NETWORK SYSTEM

BACKGROUND OF THE INVENTION

The present invention relates to a loop bus priority control method for use in a network in which a plurality of processors are connected through a uni-directional loop bus.

In the conventional loop bus network in which a plurality of host processors are connected by a unidirectional loop bus through node processors, in order to shorten the data transmission delay time, there is often adopted a through-communication method where data passed through without processing. In accordance with this method, since the bus is theoretically treated as one common bus, when a plurality of host processors simultaneously require data transmission, a contention for use of the bus may occur. Accordingly, permission for use of the bus must be given to the host processors in some orderly manner which will avoid such contention.

For this purpose, there has heretofore been a central control system in which a processor for use exclusively in controlling the bus is formed in the loop and this processor performs the control necessary to properly allocate use of the bus. However, according to this known system, the required control is very difficult and high speed transmission is difficult to achieve. Furthermore, if trouble or disorder occurs with this bus control processor, the entire system will not function at all.

SUMMARY OF THE INVENTION

It is a primary object of the present invention to provide a loop bus priority control method in which, without provision of a particular control device on the loop, priority levels are given to messages, the use of the bus is permitted to messages having a higher level in a predetermined order, and with respect to messages of the same level, the respective computers are allocated use of the bus on the basis of a subpriority allocation which may be different for different message levels.

The present invention relates to a network in which a plurality of processors are connected through a unidirectional loop bus and each of the processors is capable of generating a transmission message with a priority-designating level number, and the present invention is characterized in that, when at least two nodes require transmission, bus control data including the level numbers of messages generated by the respective nodes and data representing the priorities assigned to said nodes are transmitted to the loop bus, but control data transmitted by said node to a succeeding node is compared with bus control data received by said node from a preceding node, and only bus control data of higher priority is transmitted to the succeeding node, whereby only bus control data from one processor is propagated all the way around the loop bus and a loop bus use light is assigned to the processor of the node which has said bus control data.

BRIEF DESCRIPTION OF THE DRAWINGS

FIGS. 2-A to 2-D are diagrams illustrating the principle of the present invention.

FIGS. 4A and 4B are diagrams illustrating the operation flow of the embodiment shown in FIG. 3.

DETAILED DESCRIPTION OF THE PREFERRED EMBODIMENTS

Figures 1, 2A:
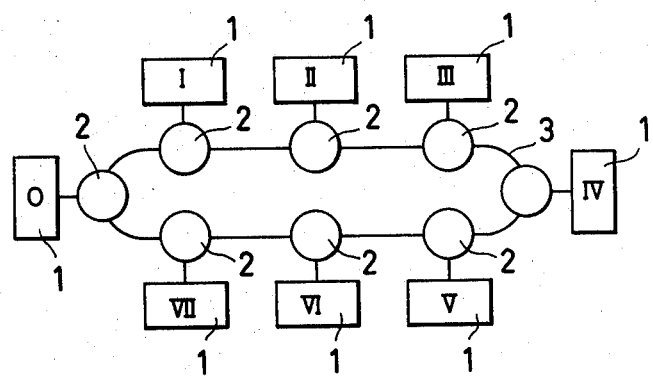
FIG. 1 is a diagram illustrating a known loop bus network system to which the present invention is applied.

FIG. 1 illustrates a known loop bus network of the type to which the present invention may be applied.

Referring to FIG. 1, reference numeral 1 represents a host processor, reference numeral 2 represents a node processor, and reference numeral 3 represents a loop bus. The system shown in FIG. 1 includes eight host processors 0 to VII and corresponding node processors.

Referring to FIGS. 2-A to 2-D, the principle of the present invention is first described.

In accordance with the present invention, levels indicating transmission priority are given to messages to be generated and transmitted by the respective host processors (hereinafter referred to as "hosts"). For example, four different levels, that is, level 0 to level 3, are selected. The message with a larger level number has a higher priority. Furthermore, even messages having the same level number differ in their priority according to the node processors (hereinafter referred to as "nodes") which have generated the messages. The priority depending on the node is called "sub-priority".

FIG. 2-A illustrates an example of the relation between the message-transmitting node and the sub-priority level determined by the node and the message level at a certain point. In accordance with the present invention, a node having a larger level number has a higher sub-priority. The embodiment shown in FIG. 2-A includes 8 nodes 0 to VII as in FIG. 1. For example, in case of messages of level 1, the message from the node II has the highest sub-priority level "7" and the message from the node I has the lowest sub-priority level "0". Priorities of messages of the same message level generated from different hosts are determined according to the sub-priorities of nodes of these messages. Priorities of messages of different levels from different hosts are determined according to the message levels irrespectively of sub-priorities. For example, in case of the message of level 0 from the host I and the message of level 2 from the host II, though the value of the sub-priority of the node of the former is 6 and is larger than that of the latter, since the message level of the latter is larger than that of the former, a priority is given to the message from the host II.

The bus control data will now be described by reference to FIG. 2-B.

The node 2 connected to the host 1 of FIG. 1 generating the message to be transmitted sends bus control data to a succeeding node 2. This bus control data comprises priority data including the message level and sub-priority level as shown in FIG. 2-B. For example, in the case of a message of level 3 from the host VI, as is seen from FIG. 2-A, the priority data is "37". In practice, the priority data is expressed according to the binary system. Accordingly, in the structure shown in FIG. 1, the above priority data includes 3 bits for the message level and 3 bits for the sub-priority level, that is, 6 bits as a whole. The sub-priorities need not be sequential and there may be missing numbers.

The priority control will now be described by reference to FIG. 2-C.

The case where messages of levels 2, 2 and 1 are generated on the nodes I, IV and VII is explained. The priority data of the nodes I, IV and VII are "22", "27" and "12", respectively. Each node continues the function of receiving the priority data from the preceding node and transmitting it to the succeeding node. However, in each of the nodes which have transmitted the priority data, the priority data received from the preceding node is compared with the priority data transmitted by said node itself, and only when the priority of the received priority data is higher than the priority of the priority data transmitted by said node itself, will the received priority data be transmitted to the succeeding node. In any other case, the received data is cancelled. Thus, the priority data "22" transmitted from the node I is cancelled at the node IV, and the priority data "12" transmitted from the node VII is cancelled at the node I, while only the priority data "27" transmitted by the node IV turns around the loop bus and is received on the node IV. Thus, the node IV acknowledges that it has obtained the bus use priority. In this case, the nodes which have received the priority data having a larger value from the node IV and transmitted it to the succeeding nodes, acknowledge that they are not selected. Further, at nodes other than the node IV, from results of comparison of priority data which has passed, it can be known what priority data has the highest priority.

The host IV to which the bus use priority has been assigned transmits a signal indicating completion of the control of the bus. By circulation of this signal around the loop bus, other hosts know that the bus control has been terminated. This signal is called a "termination code" and is one of the bus control signals. The foregoing operation represents the control phase of the bus. After termination of the control phase, the operation enters into the message transmission phase, and the respective nodes and corresponding hosts perform the process of receiving and transmitting messages.

In order to uniformalize the prior selection of messages of the same level, after termination of the priority control phase, the values of the sub-priorities of the nodes of the selected message level are changed. In the above-mentioned case, since the respective nodes can know the highest priority data value "27" and the sub-priority value of "7" is highest with respect to the level "2", this highest priority value of "7" is subtracted from the sub-priority value of each node. Namely, the subtraction is made by subtracting the maximum binary value (7 in this case) among sub-priority values of the bus control data shown in FIGS. 2-B from the sub-priority value of each node under a mode of the total processor number (8 in this case). As a result, as shown in FIG. 2-D, the new sub-priority value of the node IV which has obtained the bus use priority is changed to "0", because the subpriority value 7 of the node IV minus the maximum binary value 7 equals "0", and the new sub-priority value of the other nodes, for example, node V is changed to 7, because the sub-priority value 6 of the node V minus the maximum binary value 7 equals −1 which is equal to 7 in a subtraction under a mode 8. Thus, it is assured that the priorities of other nodes become higher than that of the node IV. In each node, the node number is adopted as the initial sub-priority value.

The above-mentioned method is one example, and there can be adopted any of a number of other methods so far as sub-priority values not overlapping other sub-priority values are generated.

Other nodes that have not obtained the bus use priority are kept in the state capable of receiving messages.

On the other hand, the node to which the bus use priority has been assigned transmits a message including address information designating the host which should receive the message. Each of the nodes in the message-receiving state receives the message and transmits it to the succeeding node. The receiver address information is checked and when the node acknowledges that said node is designated as the receiver, said node transmits the message to its host. The node which has obtained the bus use priority receives the message which has turned around the loop bus but this node does not transmit this message to the succeeding node. When the respective nodes know termination of transmission of the message, the transmission phase is changed to the priority control phase again, and the above-mentioned operation is repeated.

One embodiment of the present invention will now be described with reference to FIGS. 3, 4-A and 4-B.

Figure 3:
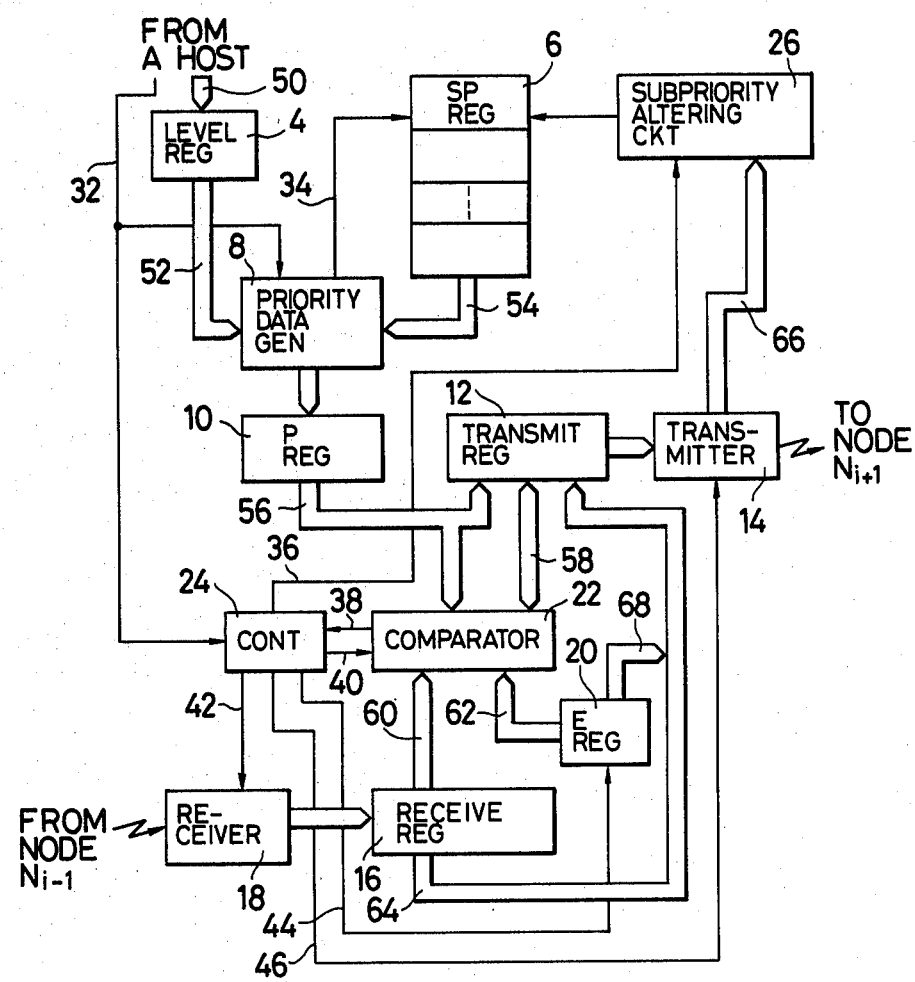
FIG. 3 is a diagram illustrating the structure of one embodiment of the present invention.

FIG. 3 shows a structure of one embodiment of the node according to the present invention. This node is representative of the node formed for each corresponding host. In FIG. 3, a level register 4 receives the message level assigned to the transmission message generated at the host through a line 50 and stores it. A plurality of sub-priority registers 6 (hereinafter referred to as "SP registers") corresponding to the respective levels are provided. For example, the SP register 6 in the node of the host I includes for registers storing the sub-priority values of 6, 0, 2 and 4 corresponding to message levels 0, 1, 2 and 3, respectively. Reference numeral 8 represents a priority data generator, which is driven by a driving signal transmitted from the host through a line 32, receives a message level written in the level register 4 through a line 52 and transmits this message level to a line 34, whereby the designated SP register 6 is retrieved. Thus, the sub-priority value of the message of said level at the self host is received by the priority data generator 8 through a line 54. From these two values, that is, the message level on the lines 52 and 54 and the sub-priority value, the priority data of the message is prepared by the generator 8. Reference numeral 10 represents a self priority register (hereinafter referred to as "P register") for storing the priority data prepared by the generator 8. Reference numerals 12, 14, 16 and 18 represent a transmit register, a transmitter, a receive register and a receiver, respectively. These elements 12, 14, 16 and 18 are known elements customarily used for ordinary data transmission. Reference numeral 20 represents a control phase end code register (hereinafter referred to as "E resister") in which a code common throughout the system but distinguishable from the priority data is stored. For example, in FIG. 2-B, the priority data is expressed by 6 bits. By using these 6 bits, also a code that can be distinguished from the priority data can be expressed. More specifically, when the host VI generates a message of level 3, the corresponding priority data is "37" (the highest priority in this case), and if the message level portion ("3") and the sub-priority portion ("7") are expressed according to the binary system and combined, there is obtained "011111". Since there is no priority data code exceeding this value, "111111" corresponding to the binary number "77" can be selected as the control phase termination code.

A comparator 22 is disposed to compare the content of the receive register 16 put out on a line 60, the content of the P register 10 put out on a line 56 and the content of the transmit register 12 put out on a line 58, and a control device 24 is disposed to control the comparator 22 through a line 40 and control other members based on the result of comparison by the comparator 22 on a line 38 or based on a signal generating a transmission message, which appears on a line 32. Reference numeral 26 represents a sub-priority altering circuit for changing the SP register 6 based on the content of the transmit register 12 under control of the control device 24.

The operation of the node having the above-mentioned structure will now be described with reference to FIGS. 4-A and 4-B.

First, the operation of the node Ni when the transmission message is generated in the corresponding host is described by reference to FIG. 4-A. When a transmission message is generated in the host (block 400), a message level put in from this host is written in through a line 50 (block 432). Simultaneously, by a driving signal on a line 32 from the host, the priority data generator 8 is driven and the message level put in from a line 52 is put out on a line 34, whereby the SP register 6 is retrieved. By this retrieval, the self priority data of the generated message is determined from the sub-priority data on the line 54 and the message level on the line 52 and is stored in the P register 10 (block 404). Under the condition that the phase at this point is the priority control phase, the self priority data is transferred to the transmit register 12 (block 406). By the transmitter 14, this self priority data is transmitted to the succeeding node Ni+1 (block 408).

The receiver 18 waits for the bus control data from the preceding node Ni−1 (block 410). When the receiver 18 receives the bus control data under the control of the signal on the line 42 (block 412), the bus control data is sent to the receive register 16. When the bus control data is stored in the receive register 16, the comparator 22 performs the following operations in response to the control signal put out on the line 40 from the control device 24.

(1) The bus control data on a line 60 is compared with the content of the E register 20, put out on a line 62. When both are in agreement with each other, it is an indication that the received control data is the control phase termination code, and therefore, the received control data is transferred to the transmit register 12 through a line 64 and transmitted to the succeeding node Ni+1. Simultaneously, the sub-priority altering circuit 26 is driven to alter the content of the SP register (block 418). The reason will be described hereinafter. Then, the message receiving and processing state is attained (block 420).

When the received bus control data is not in agreement with the content of the E register 20, it is an indication that the control data is not the control phase termination code but priority data. In other words, it is determined that the control phase has not been terminated. Accordingly, the necessary bus control operation is performed based on the received priority data.

(2) The bus control data on the line 60 is compared with the content of the P register 10. When both are in agreement with each other, it is an indication that the priority data transmitted by the self node has turned around the loop bus. Thus, it is acknowledged that the self node has obtained the bus use priority. In order to indicate that the control phase has been terminated throughout the system, the content of the E register 20 is transferred to the receive register 12 through a line 68, and the bus control data comprising the control phase termination code is sent out to the bus (block 422). Further, the sub-priority altering circuit 26 is driven to alter the content of the SP register 6 (block 424). Then, the message transmitting and processing state is attained (block 426).

When the received control data is not in agreement with the P register 10 (it is not in agreement with the content of the E register; if both are in agreement with each other, the operation (1) mentioned above is performed), the necessary bus control operation is performed based on the priority data.

(3) The bus control data on the line 60 is compared with the content of the transmit register 12, put out on the line 58. When the content of the transmit register 12 is larger than the received bus control data, the content of the transmit register 12 is not altered but by resetting the register 16 by the control device 24, the received control data is cancelled (block 428). The receive circuit 18 waits for the bus control data to be transmitted next.

When the content of the transmit register 12 is smaller than the received bus control data, by transmitting the received bus control data to the transmit register 12 through the line 64, the content of the transmit register 12 is rewritten (block 430). The rewritten content of the transmit register 12 is transmitted as new priority data to the succeeding node Ni+1 through the transmitter 14.

While cancellation of the received control data or rewriting of the content of the transmit register 12 to the received control data every time the bus control data is received, the received control data is in agreement with the content of the E register 20 or P register 10. Once such state is attained, the operation is performed in the same manner as described above in section (1) or (2).

The above operations are those performed in the node corresponding to the host which has generated the transmission message. In the above explanation, the three comparison operations of the comparator 22 are described in an order of (1), (2) and (3) for convenience's sake. However, the actual order of the operations is not limited to this order. For example, judgement as to whether or not the received bus control data is the control phase termination code, that is, the comparison of the content of the receive register 16 with the content of the E register 20, may be performed after judgement as to whether or not the received bus control data is the priority data transmitted by the self node, that is, comparison of the content of the receive register with the content of the P register 10.

The operation in the node corresponding to the host which has not generated the transmission message can be simplified because it need not be taken into account whether or not the self node has obtained the loop bus use priority. This operation will now be described by reference to FIG. 4-(B).

In this case, since there is no transmission message, the self priority data is not formed and therefore, the P register 10 does not participate in the operation. In this node, the bus control data may only pass through, and comparison with the transmit register 12 need not be performed. In addition to examination of agreement or disagreement between the received control data and the content of the E register 20, the node may only transfer the control data to the transmit register 12 and transmit it to the succeeding node Ni+1, and may repeat this operation every time the bus control data is received (blocks 500 to 512). When the bus control data is in agreement with the content of the register E, as described in (1) above, the content of the SP register is altered and the message receiving processing is then conducted (blocks 514 and 516).

The sub-priority determined from the transmission message-generating host and the message level is set as shown in the table of FIG. 2-A, and when a message of the same level is generated, the sub-priority is always determined according to the message-generating host and the bus use priority is sometimes given partially to certain hosts. In the above-mentioned embodiment, this problem is solved by starting the sub-priority altering circuit 26 at every termination of the priority control phase to change the content of the SP register.

In the priority control phase, every time the priority data is put in the transmit register 12, this priority data is put in the sub-priority altering circuit 26 through a line 66. The circuit 26 includes comparing means (not shown) for detecting the highest priority data among put-in priority data, means (not shown) for storing this maximum value and a subtractor (not shown) for altering the sub-priority data. The store means is reset at "0" at the start of the priority control phase, and every time priority data is put in the transmit register 12, the priority data stored in the store means is compared with newly put-in priority data by comparing means of the circuit 26. When the newly put-in priority data is larger than the priority data stored in the store means of the circuit 26, the priority data newly put in the transmit register 12 is stored in the store means of the circuit 26.

When the newly put-in priority data is smaller than the priority data stored in the store means of the circuit 26, alternation of the stored data is not performed.

The above processing is performed by the control signal on the line 36 from the control circuit 24 every time the priority data is stored in the transmit data. More specifically, the above processing is performed every time the operations of blocks 406, 422 and 430 are conducted in FIG. 4-A or the operation of block 504 is conducted in FIG. 4-B.

In the foregoing manner, a largest data among the priority data transferred in the loop is always stored in the circuit 26 of each node. Then, in the operations of blocks 418 and 424 in FIG. 4-A or in the operation of block 514 in FIG. 4-B, the circuit 26 performs the following operations in response to an alteration instructing signal on the line 36.

The content of the SP register 6 corresponding to the message level is read out from the priority data stored in the store means in the circuit 26 of the node, and subtraction is conducted by the subtractor (not shown) while using the sub-priority data of the priority data stored in the store means in the circuit 26 as a mode.

The transmission processing is performed in the following manner.

The node which has acknowledged assignment of the bus use priority transmits the control phase termination code to the bus and puts the message including the address of the host in the transmit register from the host connected to said node through a predetermined signal line (not shown) under the control of the control device 24, and the bus is transmitted through the transmitter 14.

The receiving processing is performed in the following manner.

There is adopted a method in which the received message is transmitted to the succeeding node. When one node receives the message, it is determined from the receive address included in the message whether or not the message is to be received by said one node. If it is acknowledged that the message is to be received by said one node, the message is transferred to the corresponding host from the receiver 18 through a predetermined signal line (not shown). When the received message is not to be received by said one node, the message is not sent to the corresponding host but cancelled. In the foregoing manner, the message is transmitted from the node which has obtained the bus use priority to the host of other desired node.

Termination of the message transfer phase is detected by each node by known means such as a message format method. After each node has acknowledged termination of the message transfer phase, the priority control phase is started.

As will be apparent from the foregoing illustration, according to the present invention, in the loop bus network system, the control is performed uniformly by using uniform node processors distributed in the system without using an integrated circuit exclusive for the bus control.

The present invention is by no means limited by the above-mentioned embodiment, but modifications and changes may be made within the range specified by the claims. For example, each node is realized by an exclusive wired logic or a program-controlled circuit.

What is claimed is:

1. For use in a loop bus network comprising a plurality of processors and a loop bus for connecting said processors to one another and for transmitting data in the form of messages in a predetermined direction therealong among said processors in series, a loop bus priority control method for selectively assigning the bus use to one of said processors on a priority bus, comprising (A) transmitting priority data to said bus from one or more of said processors when message transmission on said loop is desired by said processor or processors, said priority data including both a message level and a sub-priority level, said message level designating the kind of message to be transmitted with respect to a plurality of different kinds of messages that might be transmitted and said sub-priority level indicating the priority level of the respective processor for the designated message level, the sub-priority levels assigned to said processors being different in different message levels;

(B) receiving in said processors priority data from said bus; and (C) enabling use of said bus by that processor whose transmitted priority data designates the highest message level without regard to sub-priority levels or designates the highest sub-priority level within the highest designated message level where the priority data transmitted by more than one processor designates the same highest message level.

2. For use in a loop bus network comprising a plurality of processors and a loop bus for connecting said processors to one another and for transmitting data in the form of messages in a predetermined direction therealong among said processors in series, a loop bus priority control method for selectively assigning the bus use to one of said processors on a priority basis, comprising (A) transmitting priority data to said bus from one or more of said processors when message transmissions on said loop is desired by said processor or processors, said priority data including both a message level and a sub-priority level, said message level designating the kind of message to be transmitted with respect to a plurality of different kinds of messages that might be transmitted and said sub-priority level indicating the priority level of the respective processor for the designated message level, the sub-priority level assigned to said processors being different in different message levels;

(B) receiving in said processors priority data from said bus;

(C) comparing in each processor desiring use of the bus the priority data received from the bus with the priority data transmitted to the bus by that processor, and (1) in those processors which have not transmitted priority data to the bus for purposes of obtaining use of the bus, (a) passing the priority data received from the bus back to the bus for transmission to the next processor, (2) in those processors which have transmitted priority data to the bus for purposes of obtaining use of the bus, (a) if the message level of the received priority data is the same as the message level of the transmitted priority data and the sub-priority level of the received priority data is lower in priority than the sub-priority level of the transmitted priority data, inhibiting transmission of the received priority data to the bus, and (b) when the received priority data is found to be identical to the transmitted priority data, transmitting on said bus a control phase termination signal for inhibiting further use of the bus for transmission of messages by other processors; and (D) transmitting a message to the bus from the processor which has acquired use of the bus by transmission of control phase termination signal.

3. A method according to claim 2, further comprising storing in each processor the sub-priority level assigned to that processor for transmission to said bus when said processor desires use of the bus, and modifying said sub-priority level in each processor when a control phase termination signal is transmitted by or received in said processor, said modification being in accordance with a predetermined relationship whereby the sub-priority levels within a designated message level for said processors are mutually reordered.

4. A method according to claim 2, further comprising storing in each processor the highest sub-priority level transmitted from that processor to the bus, storing in each processor the sub-priority level currently assigned to that processor, and modifying the currently-assigned sub-priority level stored in each processor in conjunction with a designated message level whenever a control phase termination signal is transmitted by or received in that processor by subtracting the stored highest sub-priority level from the stored currently-assigned sub-priority level and storing the result as a new currently-assigned sub-priority level.

5. A method according to claims 3 or 4 wherein, when the message level of the received priority data is higher in priority than the message level of the transmitted priority data in a processor which has transmitted priority data to the bus for purposes of obtaining use of the bus, the received priority data is transmitted to the bus from that processor without regard to its sub-priority level.

6. For use in a loop bus network comprising a plurality of processors and a loop bus for connecting said processors and transmitting data in a predetermined direction therealong among said processors, a loop bus priority control method for selectively assigning the bus use priority to one of said processors, comprising:

transmitting priority data to said bus from each of a group of said processors when message transmission on said loop is desired by a processor or processors before transmitting a message to said bus, said priority data including both message level data and sub-priority level data, said message level data designating the kind of message to be transmitted with respect to a plurality of different kinds of messages and said sub-priority level data indicating the priority level of the respective processor for the designated message level, wherein the priority difference of two items of priority data solely depends upon said message level when said two items of priority data have different message levels and depends upon said sub-priority data when said two items of priority data have the same message level;

controlling the transmission of said priority data within each of said processors when said processor receives said priority data from said bus, in such a manner that said processor transmits said received priority data to said bus under a condition where each processor does not belong to said group of processors or said priority data already transmitted from said processor designates a lower priority than said received priority data, and in such a manner that said processor prohibits transmitting received priority data to said bus under a condition where the priority data already transmitted from said processor designates a priority which is higher than or equal to that of said received data;

storing said received priority data within each of said processors when said priority data newly received by each of said processors is higher than the priority data already received by each of said processors, thereby storing within each of said processors the maximum level of priority data circulating along said bus;

transmitting a control phase end code from one of said processors to said bus when said one processor receives the priority data which is the same as the priority data already transmitted from said one processor to the bus;

receiving said control phase end code in each of said processors other than said one processor;

altering the sub-priority data stored beforehand in and assigned to each of said processors in case of transmitting said control phase end code in said one processor and in case of receiving said control phase end code in each of said processors other than said one processor, said alteration being done within each of said processors in such a manner that sub-priority data in each of said processors corresponding to a message level of said maximum priority data is altered according to a predetermined relationship so that sub-priority data in said one processor corresponding to said message level is smaller than sub-priority data corresponding to said message level in any of said processors other than said one processor and so that sub-priority data for said message level in each of said processors is mutually different; and transmitting a message from said one processor to said bus after transmitting said control phase end code to said bus.

7. A bus priority control method according to claim 6, wherein said alteration is done in such a manner that new sub-priority data is obtained by subtracting the subpriority data of said maximum priority data from sub-priority data of each of said processors under a mode of a total processor number.

8. A loop bus network including a plurality of processors and a loop bus connecting said processors to one another for transmitting data in the form of messages in a predetermined direction therealong among said processors, each of said processors comprising
   (A) means for transmitting priority data to said bus when message transmission on said loop is desired by said processor, said priority data including both a message level and a sub-priority level, said message level designating the priority level of the message to be transmitted with respect to the level of a plurality of different kinds of messages that might be transmitted and said sub-priority level indicating the priority level of the processor with respect to the other processors for the designated message level, the sub-priority levels assigned to said processors being different in at least a plurality of said message levels;
   (B) means for receiving priority data from said bus and other signals from said bus; and
   (C) control means responsive to the relationship between priority data transmitted to said bus and priority data received from said bus for enabling said processor to use said bus for the transmission of messages when the transmitted priority data designates a higher message level than said received priority data without regard to sub-priority levels or, when the sub-priority level of the transmitted priority data is at a higher priority level than that of the received priority data where another processor has transmitted priority data with the same highest message level.

9. A loop bus network according to claim 8, wherein said control means in each processor includes means for comparing priority data received from said bus to priority data transmitted from said processor to said bus for purposes of acquiring use of said bus and first means responsive to said comparing means for effecting transmission of the received priority data back onto said bus to the next processor when the message level of the received priority data has a higher priority than the transmitted priority data and for blocking further transmission of said received priority data when the message level thereof has a lower priority.

10. A loop bus network according to claim 9, wherein said control means includes second means responsive to an indication from said comparing means that the message levels of the received and the transmitted priority data is the same for effecting transmission of the received priority data when the sub-priority level thereof is a higher priority than that of said transmitted priority data and for otherwise blocking further transmission of said received priority data.

11. A loop bus network according to claim 10, wherein said control means includes third means responsive to an indication from said comparing means that the received priority data and the transmitted priority data are identical for applying a control phase termination signal to said bus, further including in each processor means responsive to detection of a control phase termination signal transmitted on said bus by another processor for preventing transmission of a message on said bus.

12. A loop bus network according to claim 11, wherein said control means includes fourth means for causing received priority data to be automatically transmitted back onto said bus to the next processor when no priority data has been transmitted to said bus by that processor for purposes of acquiring use of said bus.

13. A loop bus network according to claim 11, further comprising in each processor means responsive to said transmitting means for storing the highest sub-priority level transmitted from that processor to the bus, means for storing a currently-assigned sub-priority level for that processor, and means responsive to said control phase termination signal detection means and said third means for modifying the currently-assigned sub-priority level stored in conjunction with a designated message level whenever a control phase termination signal is applied to or received from said bus by said processor.

14. A loop bus network according to claim 13, wherein said modifying means in said processors include means for mutually reordering the sub-priority levels within a designated message level so that the sub-priority level within the designated message level for the processor generating said control phase termination signal will be changed to the lowest level of priority.

15. A loop bus network according to claim 13, wherein said modifying means in each processor includes means for subtracting the stored highest sub-priority level from the stored currently-assigned sub-priority level.

16. A loop bus network comprising
   a plurality of processors and
   a loop bus for transmitting data in a predetermined direction therealong among said processors; wherein each of said processors comprises:
   priority data generating means for generating priority data in response to generation of a message transmission request therewithin, said priority data including a message level and a sub-priority level, said message level depending on the kind of message to be transmitted and said sub-priority level depending on said message level and a processor number assigned to each of said processors, wherein the priority difference between two items of priority data solely depends upon said message level when said two items of priority data have different message levels and depends upon said sub-priority data when said two items of priority data have the same message level;
   first register means connected to said priority data generating means for storing said priority data generated thereby;
   means connected to said bus for transmitting priority data stored in said first register means to said bus;
   means connected to said bus for receiving data from said bus;
   means connected to said receiving means for comparing the priority data received from said bus by said receiving means with the priority data stored in said first register means; and means connected to said comparing means for controlling transmission of said priority data received by said receiving means in such a manner that said received priority data is sent to said bus by means of said transmitting means when no priority data is stored in said first register means or when the priority data stored in said first register means designates a lower priority than said received priority data, and said received priority data is not sent to said bus when said priority data stored in said first register means designates a higher priority than said received priority data;

wherein said transmitting means comprises first means for transmitting a message to be transmitted to said bus in response to an output of said comparing means which shows that the priority data stored in said register means is the same as said received priority data, second means for supplying a control phase end code, third means connected to said supply means for transmitting said control phase end code in response to said output of said comparing means which shows that the priority data stored in said first register means is the same as said received priority data, and fourth means for transmitting said message after transmitting said control phase end code;

wherein said priority data generating means comprises a plurality of storage means for independently storing sub-priority data for the respective ones of said message levels, addressing means for selectively reading one of said storage means in response to a message level associated with said message transmission request generated in each of said processors, combining means for forming priority data as a combination of said message level associated with said message transmission request and said sub-priority data read out of said storage means; and means for altering the sub-priority data stored in said storage means, wherein said sub-priority altering means includes second register means for storing priority data, means for comparing priority data stored in said second register means with priority data received from said bus, means for writing said received priority data in said second register means when said received priority represents a higher priority than the priority data already stored in said second register means, thereby storing maximum priority data which has maximum priority among priority data circulating along said bus, and means for rewriting the sub-priority data stored in said storage means corresponding to a designated message level of said maximum priority data, depending on the sub-priority data of said maximum priority data and according to a predetermined relationship, when said control phase end code is transmitted or received; said relationship being one which assures that sub-priority data for said message level of said maximum priority data becomes minimum within one of said processors which generates said maximum priority data among said processors.

17. A loop bus network system according to claim 16, wherein said rewriting means includes means for subtracting the sub-priority data of the maximum priority data from the sub-priority data already stored in said storage means for a message level which is at the message level of said maximum priority data under a mode of a total processor number.

* * * * *